US009852516B2

(12) United States Patent
Cody et al.

(10) Patent No.: US 9,852,516 B2
(45) Date of Patent: Dec. 26, 2017

(54) APPARATUS AND PROCESSES FOR ESTIMATING RIVER VELOCITY (71) Applicant: RAYTHEON COMPANY, Waltham, MA (US)

(72) Inventors: Mac A. Cody, Richardson, TX (US); Grant B. Boroughs, Plano, TX (US)

(73) Assignee: RAYTHEON COMPANY, Waltham, MA (US)

(*) Notice: Subject to any disclaimer, the term of this patent is extended or adjusted under 35 U.S.C. 154(b) by 23 days.

(21) Appl. No.: 15/008,942

(22) Filed: Jan. 28, 2016

(65) Prior Publication Data
US 2016/0225162 A1    Aug. 4, 2016

Related U.S. Application Data (60) Provisional application No. 62/110,019, filed on Jan. 30, 2015.

(51) Int. Cl.
*G01C 13/00* (2006.01)
*G06T 7/60* (2017.01)
*G06T 7/246* (2017.01)
*G06T 7/62* (2017.01)

(52) U.S. Cl.
CPC .............. *G06T 7/602* (2013.01); *G01C 13/00* (2013.01); *G06T 7/246* (2017.01); *G06T 7/62* (2017.01); *G06T 2207/10016* (2013.01); *G06T 2207/20036* (2013.01); *G06T 2207/30172* (2013.01); *G06T 2207/30181* (2013.01)

(58) Field of Classification Search
CPC ..................................................... G01C 13/00
See application file for complete search history.

(56) References Cited

U.S. PATENT DOCUMENTS

2011/0106317 A1* 5/2011 Kram .................. G06Q 10/04
700/281

OTHER PUBLICATIONS

Liu, Y. B., S1 Gebremeskel, F. De Smedt, L. Hoffmann, and L. Pfister. "A diffusive transport approach for flow routing in GIS-based flood modeling." Journal of Hydrology 283, No. 1 (2003): 91-106.*
Yang, Jie, Ronald D. Townsend, and Bahram Daneshfar. "Applying the HEC-RAS model and GIS techniques in river network flood-plain delineation." Canadian Journal of Civil Engineering 33, No. 1 (2006): 19-28.*

(Continued)

*Primary Examiner* — Sumati Lefkowitz
*Assistant Examiner* — Carol Wang
(74) *Attorney, Agent, or Firm* — Lando & Anastasi, LLP (57) ABSTRACT According to at least one aspect, a river velocity estimation system is provided. The river velocity estimation system includes one or more components executable by at least one processor that are configured to receive terrain information and at least one image including a river, identify an area of interest in the at least one image that includes the river, identify a course of the river and a boundary of the river based on the area of interest in the at least one image, estimate a slope of the river based on the terrain information, determine a hydraulic radius of the river based on the boundary of the river and the course of the river, and estimate a flow rate of water in the river based on at least the slope of the river and the hydraulic radius of the river.

18 Claims, 5 Drawing Sheets (56) References Cited

OTHER PUBLICATIONS

Tate, Eric C., David R. Maidment, Francisco Olivera, and David J. Anderson. "Creating a terrain model for floodplain mapping." Journal of Hydrologic Engineering 7, No. 2 (2002): 100-108.*

Brander, Robert W. "Field observations on the morphodynamic evolution of a low-energy rip current system." Marine geology 157, No. 3 (1999): 199-217.*

Anderson, David James. "GIS-based hydrologic and hydraulic modeling for floodplain delineation at highway river crossings." Master's thesis, University of Texas at Austin, 2000.*

Brunner, Gary W. "HEC-RAS (River Analysis System)." In North American Water and Environment Congress & Destructive Water:, pp. 3782-3787. ASCE, 2010.*

Merwade, Venkatesh, and David R. Maidment. River Channel Morphology Model: A Tool for Analyzing and Extrapolating River Channel Bathymetry. University of Texas at Austin, Center for Research in Water Resources, JJ Pickle Research Campus, 2005.*

Pavelsky, Tamlin M., and Laurence C. Smith. "RivWidth: A software tool for the calculation of river widths from remotely sensed imagery." IEEE Geoscience and Remote Sensing Letters 5, No. 1 (2008): 70-73.*

Schulze, Kerstin, Martin Hunger, and Petra Döll. "Simulating river flow velocity on global scale." Advances in Geosciences 5 (2005): 133-136.*

Casas, A., Gerardo Benito, V. R. Thorndycraft, and M. Rico. "The topographic data source of digital terrain models as a key element in the accuracy of hydraulic flood modelling." Earth Surface Processes and Landforms 31, No. 4 (2006): 444-456.*

Author Unknown, "Water Measurement Manual: A Guide to Effective Water Measurement Practices for Better Water Management", U.S. Department of the Interior, Bureau of Reclamation, 2001, 317 Pages.

Merwade, et al., "Geospatial Description of River Channels in Three Dimensions", Bureau of Engineering Research, The University of Texas at Austin, Aug. 2004, 256 Pages.

Mesick, et al., "A Preliminary Investigation into the Estimation of River Depth Based on Meander Geometry", Naval Research Laboratory, Marine Geoscience Division, Stennis Space Center, Report No. NRL/MR/7440-04-881, Sep. 20, 2004, 36 Pages.

Schall, et al., "Introduction to Highway Hydraulics", U.S. Department of Transportation, Federal Highway Administration, Hydraulic Design Series No. 4, 4th Edition, Publication No. FHWA-NHI-08-090, Jun. 2008, 202 Pages.

* cited by examiner

APPARATUS AND PROCESSES FOR ESTIMATING RIVER VELOCITY

RELATED APPLICATIONS

The present application claims priority under 35 U.S.C. §119(e) to U.S. Provisional Application 62/110,019, titled "APPARATUS AND PROCESSES FOR ESTIMATING RIVER VELOCITY," filed on Jan. 30, 2015, which is hereby incorporated herein by reference in its entirety.

FEDERALLY SPONSORED RESEARCH

This application was made with government support under Contract Number N3237B-06-C-1903 awarded by [federal agency withheld]. The U.S. government has certain rights in this invention.

BACKGROUND

A river is a natural stream of water flowing in a channel to the sea, a lake, or another such stream. Water flow rates in rivers are typically estimated based on information obtained from various sensors placed into the water flowing in the river. For example, fluid velocity sensors and/or fluid level sensors may be placed at select locations in the river and the flow rate may be determined based on the direct measurements obtained from the sensors. These sensors may be installed at multiple locations along a river as part of gauging stations specifically designed to monitor various parameters of the river.

SUMMARY OF INVENTION

Aspects and examples relate to systems and methods for estimating the flow rate of water in a river based on captured images of the river and terrain information. By estimating the flow rate of the water in the river without obtaining direct measurements, the water flow rate may be more easily determined.

According to at least one aspect, a river velocity estimation system is provided. The river velocity estimation system includes at least one processor coupled to a memory, an image analysis component executable by the at least one processor and configured to receive at least one image including a river and identify an area of interest in the at least one image, the area of interest including the river, a river analysis component executable by the at least one processor and configured to receive terrain information and the area of interest in the at least one image, identify a course of the river and a boundary of the river based on the area of interest in the at least one image, estimate a slope of the river based on the terrain information, and determine a hydraulic radius of the river based on the boundary of the river and the course of the river, and a flow rate estimation component executable by the at least one processor and configured to estimate a flow rate of water in the river based on at least the slope of the river and the hydraulic radius of the river.

In one example, the image analysis component is further configured to identify the area of interest at least in part by segmenting the river from the at least one image. In one example, the river analysis component is further configured to align the terrain information with the area of interest in the at least one image. In one example, the terrain information includes high resolution terrain data.

In one example, the river analysis component is further configured to determine the hydraulic radius by determining a ratio of a cross sectional area of the river to a wetted perimeter of the river. In this example, the river analysis component may be further configured to generate a model of a riverbed of the river based on a location of a thalweg of the river. The river analysis component may be yet further configured to determine at least one of the cross sectional area of the river and the wetted perimeter of the river based on the model of the riverbed.

In one example, the river analysis component is further configured to estimate a degree of resistance of the river. The degree of resistance of the river may be, for example, a Manning's roughness coefficient. In this example, the flow rate estimation component may be further configured to estimate the flow rate of water in the river based on the degree of resistance of the river.

According to one aspect, a method of estimating a velocity of water in a river is provided. The method includes receiving, by an image analysis component executable by at least one processor, at least one image including a river, identifying, by the image analysis component, an area of interest in the at least one image, the area of interest including the river, receiving, by a river analysis component executable by the at least one processor, terrain information, identifying, by the river analysis component, a course of the river and a boundary of the river based on the area of interest in the at least one image, estimating, by the river analysis component, a slope of the river based on the terrain information, determining, by the river analysis component, a hydraulic radius of the river based on the boundary of the river and the course of the river, and estimating, by a flow rate estimation component executable by the at least one processor, a flow rate of water in the river based on at least the slope of the river and the hydraulic radius of the river.

In one example, identifying the area of interest includes segmenting the river from the at least one image. In one example, the method further includes aligning the terrain information with the area of interest in the at least one image. In one example, receiving the terrain information includes receiving high resolution terrain data.

In one example, determining the hydraulic radius includes determining a ratio of a cross sectional area of the river to a wetted perimeter of the river. In this example, the method may further include generating a model of a riverbed of the river based on a location of a thalweg of the river. The method may still further include determining at least one of the cross sectional area of the river and the wetted perimeter of the river based on the model of the riverbed.

In one example, the method further includes estimating a degree of resistance of the river. The estimate of the degree of resistance may be, for example, a Manning's roughness coefficient for the river. In this example, estimating the flow rate of water in the river includes estimating the flow rate of water in the river based on the degree of resistance of the river.

Still other aspects, examples, and advantages of these exemplary aspects and examples, are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Aspects and examples disclosed herein are directed to apparatus and processes for estimating river velocity based on captured images of a river and terrain information. For example, various parameters may be extracted from the images of the river and merged with local terrain information to form an accurate model of the river. The model of the river may be employed to determine an estimate of the flow rate of water in the river. These apparatus and processes are suitable for a variety of applications including agricultural planning, river crossing, and river navigation.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements, and features discussed in connection with any one or more examples are not intended to be excluded from a similar role in any other example. Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. The use herein of "including," "comprising," "having," "containing," "involving," and variations thereof is meant to encompass the items listed thereafter and equivalents thereof as well as additional items. References to "or" and "and/or" may be construed as inclusive so that any terms described using "or" and "and/or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Example River Velocity Estimation System

Figure 1:
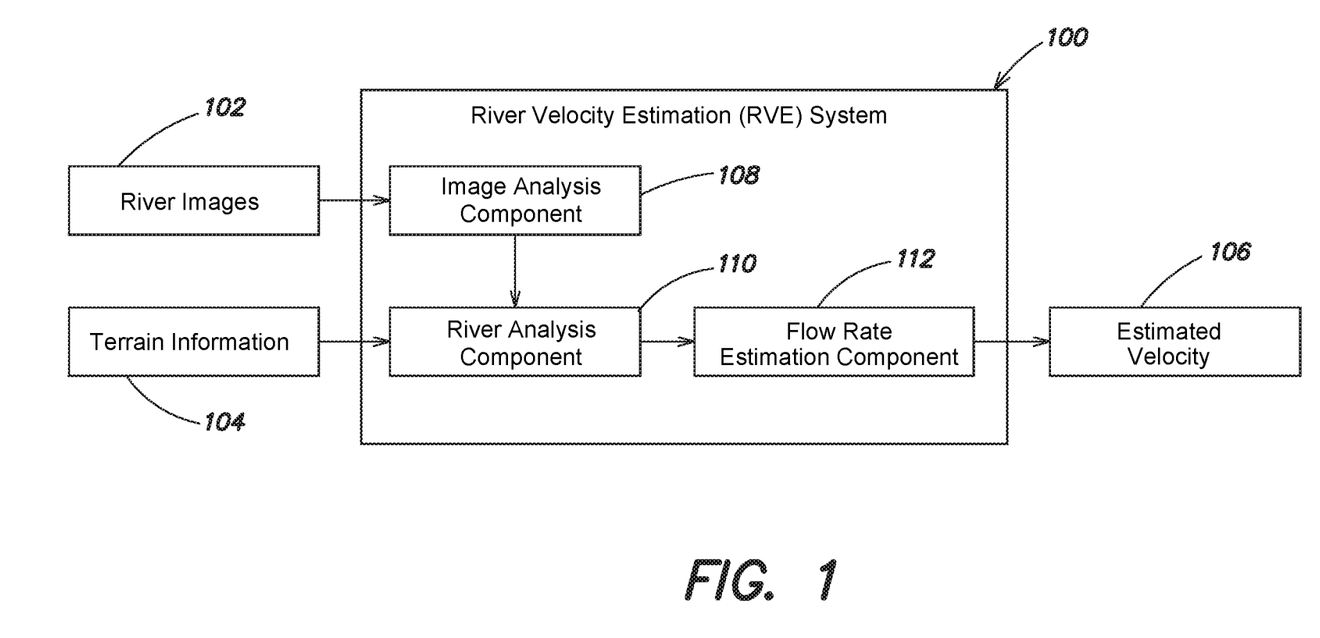
FIG. 1 is a diagram of an example river velocity estimation system.

FIG. 1 illustrates an example river velocity estimation (RVE) system 100 constructed to determine an estimated velocity 106 of water in a river based on river images 102 and terrain information 104. The RVE system 100 extracts information from the river images 102 including, for example, the course of the river in addition to the width of the river and merges the information gleaned from the images with terrain information to form a model of the river. The model of the river may be employed to generate an estimate of the flow rate of water in the river based on known characteristics of water.

As shown in FIG. 1, the RVE system 100 includes an image analysis component 108 configured to receive and process the river images 102. The image analysis component 108 may be configured to analyze the river images 102 to identify an area of interest (AOI) in the river images. In some examples, the AOI may include the river of interest and exclude the background portion of the river images 102 (e.g., mountain ranges, trees, vegetation, buildings, etc.). The AOI may be identified by a variety of image processing techniques. For example, the image analysis component 108 may identify rapid changes in pixel intensity as the pixel values change from illustrating water to illustrating surrounding scenery. It is appreciated that other methods may be employed to identify the AOI in the river images as described in more detail below with reference to act 204 of identifying an AOI in river images in the RVE process 200 shown in FIG. 2.

The river analysis component 110 may receive the AOI from the image analysis component 108 in addition to the terrain information 104. The river analysis component 110 may be configured to merge information from the AOI with the terrain information 104 to form a model of the river. For example, the river analysis component 110 may be configured to identify the width of the river from the AOI, identify a slope of the river from the terrain information 108, and merge the width of the river with the slope to form model of the river. It is appreciated that other parameters may be taken into account in the model of the river as described in more detail below with reference to river characteristic identification process 300 shown in FIG. 3.

The flow rate estimation component 112 receives the river characteristics from the river analysis component 110 and generates the estimated velocity 106 of water in a river including an estimate of the water flow rate. For example, the flow rate estimation component 112 may use the river characteristics to construct a model and estimate the flow rate based on the model. The flow rate estimation process is described in more detail below with reference to act 208 of estimating the flow rate in RVE process 200 shown in FIG. 2.

The RVE system 100 may be implemented in a variety of ways. In some examples, the RVE system 100 may be implemented on a computer system, as described below with reference to FIG. 6, communicatively coupled to other systems including, for example, an imaging system to capture the images. For example, the components 108, 110, and 112 may be implemented as software components that are stored within a data storage element of the computer system and executed by a processor.

In other examples, the RVE system may be implemented as a navigation device configured to, for example, estimate the time it will take a vessel to travel along a river based on the estimated river flow rate. The navigation device may determine the amount of energy required to navigate the river for powered vessels (e.g. freighter or tow boat with barges) based on identified dimensions of the river and/or the water flow rate. The navigation device may also include functionality suitable for recreational purposes and aid in planning routes for unpowered vessels (e.g., kayaks and canoes) by selecting routes with a lower water flow rate to ease navigation of the vessel. In some examples, the navigation device may further include a global positioning system sensor to determine the position of the vessel. In these examples, the navigation device may display vessel position in addition to estimated river velocity for current and upcoming river sections.

Having described various possible implementations, it is appreciated that the RVE system may be implemented in other ways. For example, the RVE system may be implemented as an agricultural planning system configured to identify the amount of water available for irrigation purposes based on the estimated water flow rate and the dimensions of the river. Regardless of the implementation, each of these RVE systems may perform one or more RVE processes to estimate the flow rate of water in a river as described in more detail below.

Example River Velocity Estimation Processes

Several examples of RVE systems perform processes that estimate the water flow rate in rivers. In some examples, these RVE processes are executed by a RVE system, such as the RVE system 100 described above with reference to FIG. 1. One example of such a process is illustrated by RVE process 200 in FIG. 2. According to this example, the RVE process 200 determines an estimated flow rate based on received river images and supporting terrain information. The RVE process identifies various characteristics of the river to construct a model of the river and estimate the flow rate based on the model of the river.

Figure 2:
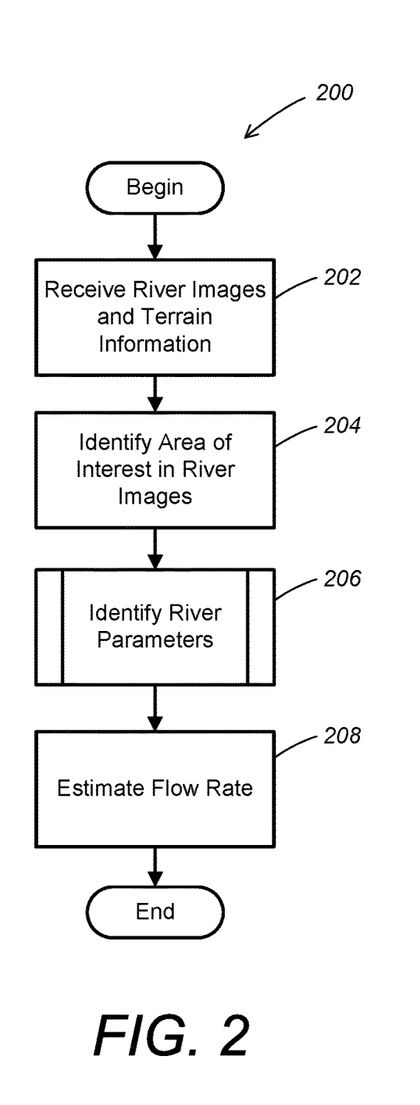
FIG. 2 is a flow chart of an example process to estimate a velocity of a river.

In act 202, the RVE system receives images of a river in addition to terrain information. The images may be represented by one or more matrices of pixel values illustrating a scene that includes a river. The RVE system may receive these images from an imaging device that is integrated into the RVE system and/or receive the images from a separate imaging device that is communicatively coupled to the RVE system. The received terrain information may describe the elevation of the terrain at various locations. For example, the terrain information may include one or more matrices of elevation values relative to sea level. Particular examples of terrain information include digital terrain elevation data (DTED®) and high resolution terrain information (HRTI) data.

In some examples, the river images may contain information that is immaterial to the RVE process 200. For example, portions of the river images may show mountains or other scenery. In act 204 in these examples, the RVE system identifies the AOI in the river images. For example, the RVE system may generate the AOI of the river images by segmenting the river from the remaining scenery. Generally, the water in the river has intensity (for panchromatic imagery) and/or spectral characteristics (for multispectral imagery) that are different than the surrounding terrain. The RVE system may utilize these traits to extract the AOI. It is appreciated that any of a variety of techniques may be employed by the RVE system to identify the AOI.

In act 206, the RVE system determines various characteristics associated with the river based on the AOI identified in the river images. In some examples, determining the characteristics of the river may be advantageous because it may create a more accurate model of the river and, thereby, improve the accuracy of the resulting flow rate estimate. For example, the RVE system may determine the width of the river and/or slope of the river. It is appreciated that various characteristics may be determined based on the particular implementation and/or the accuracy requirements for the resulting estimated flow rate.

Figure 4:
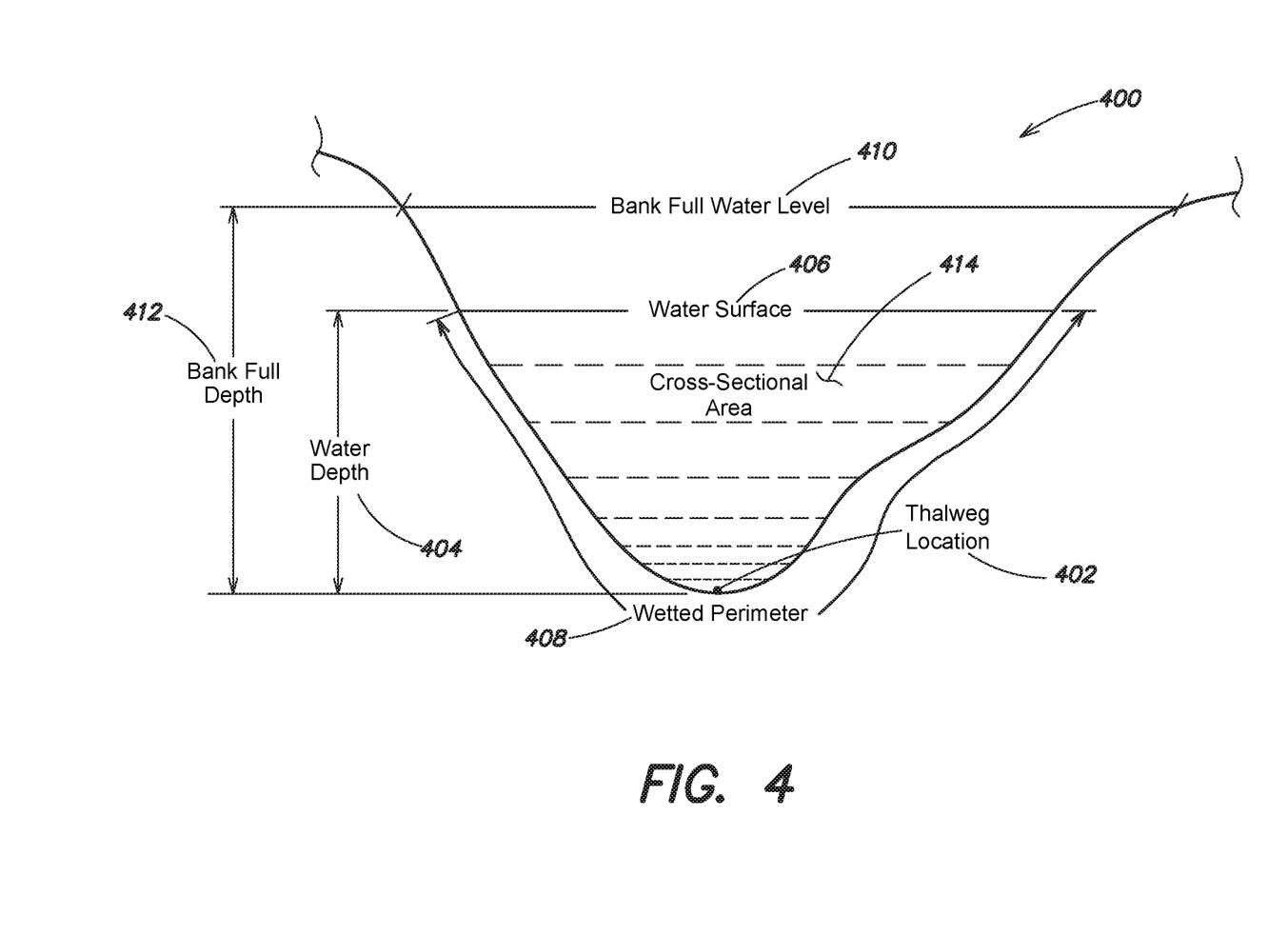
FIG. 4 is a diagram of a cross section of a river.

Example river characteristics that may be identified by the RVE system in act 206 are illustrated by a labeled cross section of a river 400 illustrated in FIG. 4. As shown in FIG. 4, the thalweg location 402 is the deepest part river and may be employed as a reference point to determine other measurements. For example, the water depth 404 of the river may be the difference in elevation between the water surface 406 and the thalweg location 402. The bank full depth 412 may be the difference in elevation between the bank full water level 410 and the thalweg location 402. Other characteristics of the river may also be determined including, for example, the wetted perimeter 408 and the cross sectional area 414. The wetted perimeter 408 is the perimeter of the cross sectional area that is in contact with the water in the river. The cross sectional area 414 of the river is the area between the water surface 406 and the riverbed.

In some examples, the RVE system may determine the hydraulic radius of the river. The hydraulic radius of a river is equal to the cross sectional area 414 of the river divided by the wetted perimeter 408 of the river as illustrated by equation (1) below:

$$R_h = \frac{A}{P_w} \quad (1)$$

In equation (1), $R_h$ is the hydraulic radius of the river, A is the cross sectional area of the river, and $P_w$ is the wetted perimeter of the river. It is appreciated that the RVE system may also determine other values including, for example, the slope of the river, and the Manning's roughness coefficient of the river. The slope of the river is the gradient of the river and may be derived from, for example, the terrain information. The Manning's roughness coefficient is a value indicative of the roughness of the floor of the river. The Manning's roughness coefficient may be estimated based on the hydraulic radius of the river, the cross sectional area 414 of the river, and the slope of the river. Example methods to determine the various river characteristics are described in more detail below with reference to the example river characteristics identification process 300 in FIG. 3.

Returning to FIG. 2, the RVE system determines the estimated flow rate in act 208 based on the characteristics of the river identified in act 206. For example, the RVE system may determine the mean velocity of the river at one or more points along the river based on the hydraulic radius of the river, the slope of the river, and/or the Manning's roughness coefficient of the river as illustrated by equation (2):

$$V = \frac{R_h^{2/3} * S^{2/3}}{n_m} \quad (2)$$

In equation (2), V is the estimated flow rate of water in the river, $R_h$ is the hydraulic radius of the river as described above with reference to equation (1), S is the slope of the river, and $n_m$ is the Manning's roughness coefficient.

Figure 3:
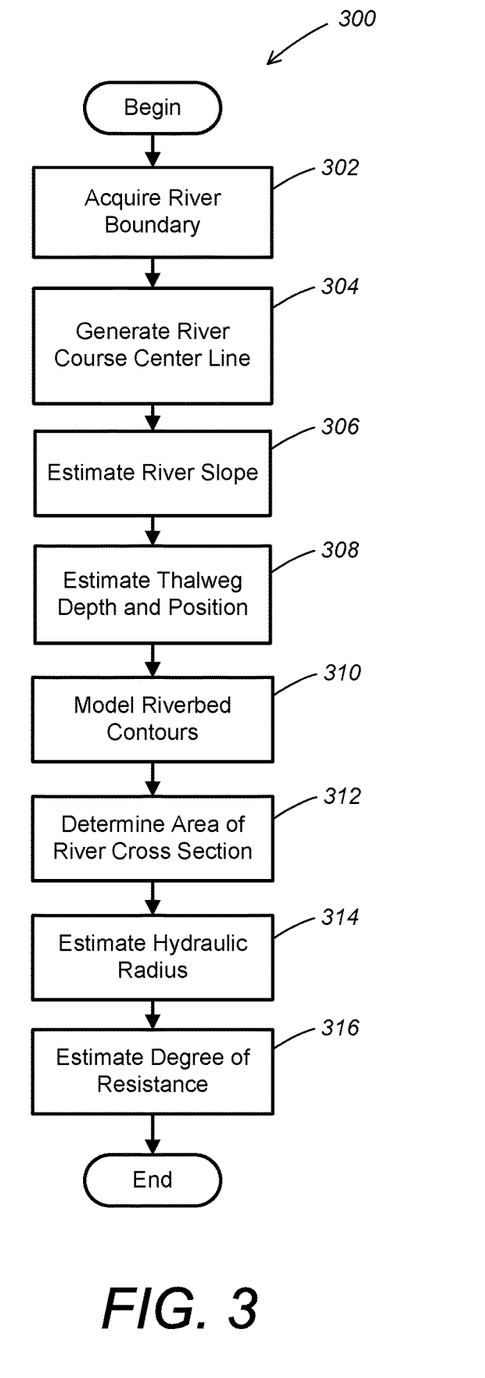
FIG. 3 is a flow chart of an example process to identify characteristics of the river.

As described above with reference to act 206, the RVE system determines various characteristics of the river based on the terrain information and/or the AOI in the river images. FIG. 3 illustrates an example river characteristic identification process 300. The river characteristics identification process 300 estimates various parameters of the river based on the information gleaned from the AOI in the river images and terrain information.

In act 302, the RVE system determines a river boundary at one or more water levels of the river. In some examples, the RVE system may determine the river boundary (e.g., the river width) when the river is at a bank full state based on HRTI data. The HRTI data may indicate the river course within the AOI as contiguous elevation posts with very similar elevations and approximately mirror the river course indicated in the river images. The RVE system may, for example, identify the river boundary in the bank full state by identifying significant changes in slope between the dry portion of the riverbed and the terrain surrounding the river in the HRTI data. In some examples, HRTI data meeting the requirements of at least level 3 is preferred to increase estimation accuracy of the bankfull state boundary.

It is appreciated that the river boundary may be estimated at water levels other than the bank full state. For example, the river may be imaged at a time when the river is at a lower water level and the river boundary may be determined at the time the image was captured. The river boundary may be determined at the time of imaging by employing various programmatic techniques on the AOI in the river images.

In act 304, the RVE system may determine the centerline of the river course. In some examples, the apparatus derives the center line of the river course from either the river course visible in the imagery or the HRTI-derived bankfull state boundary. The centerline of the river course may be determined by, for example, by a morphological erosion process to estimate the distance of the center point from the edges of the river. In this example, the RVE system thins the river course from both edges equally until a central line is formed. It is appreciated that other techniques may be employed to identify a center of the river course.

In act 306, the RVE system estimates the river slope from the received terrain information. In one example, the size of the AOI must be large enough to cover a minimum number of elevation posts in the terrain information. Once at least the minimum number of elevation posts are identifies, the RVE system determines an average of height of the elevations posts heights near both the top side of the river in the AOI and the bottom side of the river in the AOI. The slope of the river may then be determined based on the difference between the average elevation post height at the top side of the river and the average elevation post height at the bottom side of the river. It is appreciated that the RVE system may determine one or more intermediate slopes in the river based on, for example, the size of the AOI.

In act 308, the RVE system estimates the thalweg depth at one or more points in the course of the river. The thalweg depth is the depth of the deepest part of the river relative to the water surface when the river is in a bankfull state. The RVE system may employ a model as illustrated below with reference to equation (3) to determine the thalweg depth.

$$D_t = e^{(ln(W/6.8)/1.54)} \quad (3)$$

In equation (3), the $D_t$ is the thalweg depth and W is the width of the river obtained from, for example, the river boundary determined in act 302.

In some examples, the RVE system also estimates the location of the thalweg in the river. The thalweg location may be determined by analyzing the course of the river downstream determined in act 304. For example, the thalweg location may generally be in the center of a river if the river course is straight and shift closer to the outer bank where the river changes course (e.g., turns). This relationship may be modeled by the piecewise function illustrated below in equation (4).

$$t_l = \begin{cases} 0.5 & \text{if } r \geq 12500 \text{ m} \\ -0.076 * \ln(r) + 1.21 & \text{if } 0 < r < 12500 \text{ m} \\ 0.87 * \ln(\text{abs}(r)) - 0.32 & \text{if } -12500 \text{ m} < r < 0 \\ 0.5 & \text{if } r \leq -12500 \text{ m} \end{cases} \quad (4)$$

In equation (4), $t_l$ is the normalized thalweg location that varies from 0 (left bank) to 1 (right bank) and r is the radius of the curvature of the river. If the center of curvature is to the right of the river, then the radius r is a positive value. Similarly if the center of curvature is to the left of the river, then the radius r is a negative value. Equation (5) is a modified version of equation (4) to receive a non-dimensional radius of curvature in place of the radius of curvature measured in meters in equation (4).

$$t_l = \begin{cases} 0.5 & \text{if } r \geq 150 \\ -0.096 * \ln(r) \pm 0.922 & \text{if } 0 < r < 150 \\ 0.092 * \ln(\text{abs}(r)) - 0.07 & \text{if } -150 < r < 0 \\ 0.5 & \text{if } r \leq -150 \end{cases} \quad (5)$$

In act 310, the RVE system models the riverbed contours (e.g., wetted perimeters) at one or more points along the river. The riverbed contours may be derived using various models. For example, the cross section of a river (including the riverbed) may be modeled as a standard shape such as a half-circle, a half-ellipse, a trapezoid, and a rectangle. In other examples, the model may be derived from empirical data of rivers and/or other flowing bodies of water. Such a model is illustrated by equation (6) below that models the riverbed contour are a sum of two Beta distribution functions.

$$f(x) = \{f_1(x|\alpha_1,\beta_1) + f_2(x|\alpha_2,\beta_2)\} * k, \text{ where } \alpha_1 \neq \beta_1, \alpha_2 = \beta_2, 0 < k < 1 \quad (6)$$

In equation (6), x represents a selected location in the cross section of the river and is normalized from 0 (left bank) to 1 (right bank). The value k is a scaling factor that keeps the function normalized. The values $\alpha_1$, $\alpha_2$, $\beta_1$, $\beta_2$ are beta curve parameters that define the shape of the river contour and are determined based the normalized thalweg location determined in act 308 above by equations 4 and/or 5. Table 1 illustrated the selected beta curve parameters for selected values of the normalized thaleg location.

TABLE 1

Beta parameters for different normalized thalweg locations

| $t_1$ | $\alpha_1$ | $\beta_1$ | $\alpha_2/\beta_2$ | k |
|---|---|---|---|---|
| 0.1 | 1.33 | 6.61 | 1.65 | 0.19 |
| 0.2 | 2.49 | 6.16 | 1.31 | 0.23 |
| 0.3 | 1.73 | 3.04 | 1.47 | 0.28 |
| 0.4 | 3.34 | 3.46 | 1.15 | 0.29 |
| 0.5 | 4.83 | 4.06 | 1.08 | 0.26 |

TABLE 1-continued

Beta parameters for different normalized thalweg locations

| $t_1$ | $\alpha_1$ | $\beta_1$ | $\alpha_2/\beta_2$ | k |
|---|---|---|---|---|
| 0.6 | 3.30 | 1.94 | 1.53 | 0.31 |
| 0.7 | 6.39 | 3.00 | 1.03 | 0.25 |
| 0.8 | 5.01 | 1.39 | 2.13 | 0.22 |
| 0.9 | 7.91 | 1.99 | 4.02 | 0.21 |

Figure 5:
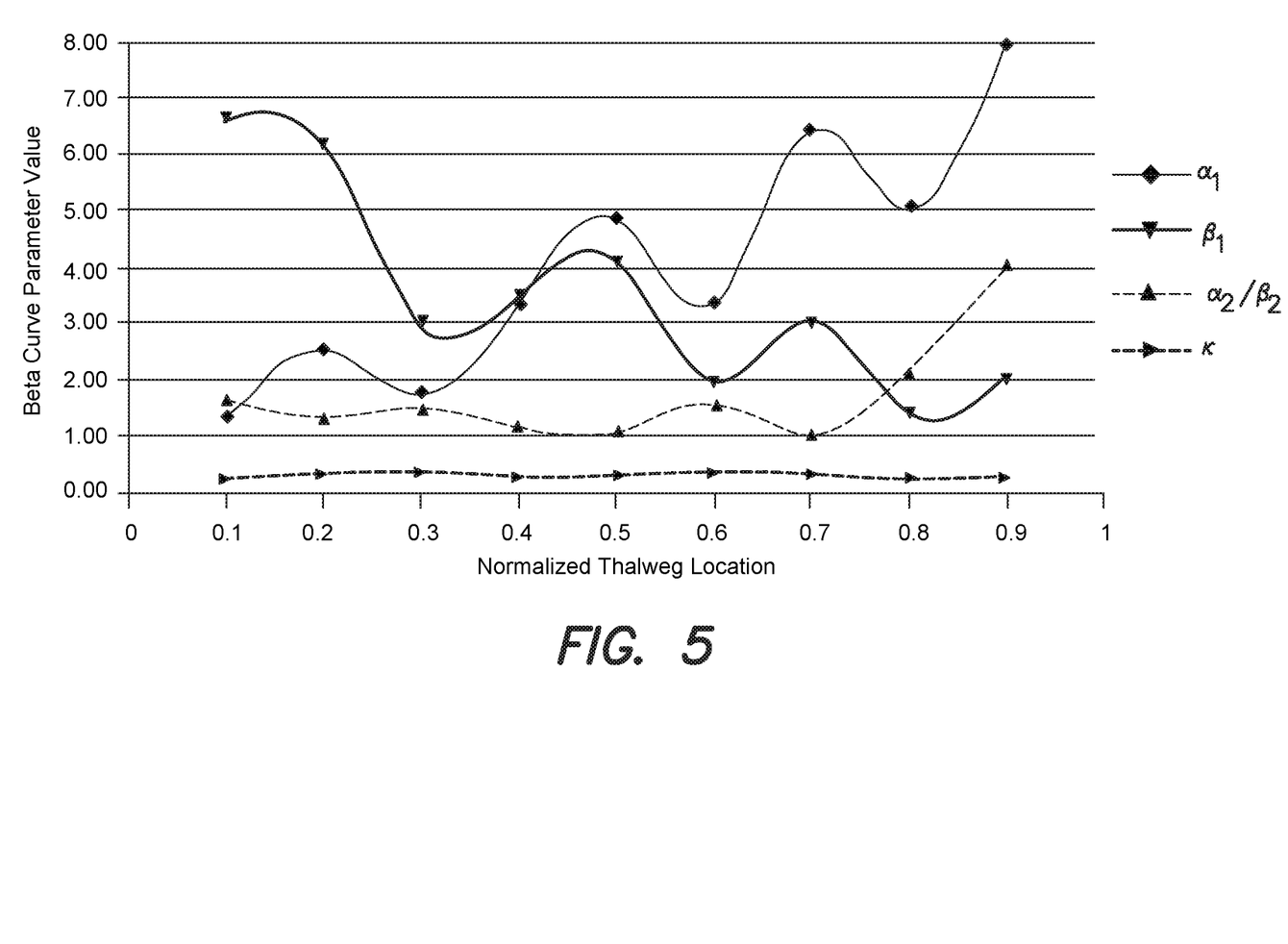
FIG. 5 is a graph illustrating various values beta curve parameters for different thalweg locations.

It is appreciated that the beta curve values may be interpolated for thalweg locations that are in-between the discrete values illustrated in table 1. For example, FIG. 5 illustrates the interpolated values for $\alpha_1$, $\alpha_2$, $\beta_1$, $\beta_2$ for any thalweg location between 0.1 (near the left bank) and 0.9 (near the right bank).

The individual beta functions $f_1(x)$ and $f_2(x)$ in equation (6) may be consistent with the standard beta distribution function illustrated below by equation (7).

$$f(x|\alpha, \beta) = \frac{x^{\alpha-1} * (1-x)^{\beta-1}}{B(\alpha, \beta)} \bigg| \text{ for } 0 < x < 1, \alpha > 0, \beta > 0 \quad (7)$$

The function $B(\alpha,\beta)$ denotes the standard beta function as illustrated below in equation (8).

$$B(\alpha,\beta) = \int_0^1 x^{\alpha-1}(1-x)^{\beta-1}dx \quad (8)$$

The beta function $B(\alpha,\beta)$ can also be written as a function of standard gamma functions as illustrated by equation (9) below.

$$B(\alpha, \beta) = \frac{\Gamma(\alpha)\Gamma(\beta)}{\Gamma(\alpha+\beta)} \quad (9)$$

The standard gamma function is illustrated by equation (10) below.

$$\Gamma(\alpha) = \int_0^\infty x^{\alpha-1} e^{-x} dx \quad (10)$$

It is appreciated that the riverbed contour derived from equation (6) may be scaled up such that the horizontal dimension matches the width of the river and/or the vertical dimension matches the estimated thalweg depth of the river.

In act 312, the RVE system determines the area of the cross section of the river at various points within the AOI. The area of the cross section of the river may be determined by, for example, integrating the area bounded by the water surface and the riverbed contour. In some examples, the cross sectional area can be found by integrating the equation defining the riverbed contour when the water surface is horizontal and flat. It is appreciated that piecewise integration may also be employed depending upon the contour of the riverbed.

In act 314, the RVE system estimates the hydraulic radius of the river at various points in the AOI. The hydraulic radius may be determined consistent with equation (1) described above by dividing the cross sectional area determined in act 312 by the wetted perimeter. In some examples, the RVE system determines the wetted perimeter based on the riverbed contour f(x) consistent with equation (11) below.

$$P_w = \int_a^b \sqrt{1 + \left(\frac{df(x)}{dy}\right)^2} \, dx \quad (11)$$

In equation (11), $P_w$ is the wetted perimeter and the values a and b are the intersection points between the riverbed contour and the water surface. In examples where the riverbed contour f(x) is normalized from 0 (left bank) to 1 (right bank), the value of a may be 0 and the value of b may be 1.

In act 316, the RVE system estimates the degree of resistance of the river. In at least one example, the degree of resistance of the river is expressed as the Manning's roughness coefficient. The RVE system may estimate the Manning's roughness coefficient of the river based on the cross sectional area of the river determined in act 312, the hydraulic radius determined in act 314, and the slope of the river determined in act 306 as illustrated by equation (12) below.

$$n_m = 0.217 * A^{-0.173} * R_h^{0.27} * S^{0.156} | \text{ for } 0.015 \leq n_m \leq 0.290 \quad (12)$$

In equation (12), A is the cross sectional area of the river, R is the hydraulic radius of the river, and S is the slope of the river.

The processes 200 and 300 described above each depict one particular sequence of acts in a particular example. The acts included in these processes may be performed by, or using, one or more computer systems or programmable devices specially configured as discussed herein. Some acts may be omitted in accord with one or more examples. Additionally, the order of the acts can be altered, or other acts can be added, without departing from the scope of the examples described herein. Furthermore, as described above, in at least one example, the acts are performed on particular, specially configured machines, namely an RVE system configured according to the examples and examples disclosed herein.

Example Special Purpose Computer System

The river velocity estimation techniques described herein may be implemented on various special purpose computer systems designed to monitor one or more characteristics of a river. These techniques improve the operation of the special purpose computer system by enabling the computer system to perform the same river velocity flow rate estimation without the need to communicate with sensors placed into the river or process the associated sensor data. Further, the river velocity estimation techniques described in certain examples produce a more accurate estimation of the river velocity by, for example, more accurately modeling the shape of the riverbed. Thereby, the special purpose computer can determine a more accurate estimate of the river velocity without the need to interface with additional sensors placed in the river or process the data from these additional sensors.

Figure 6:
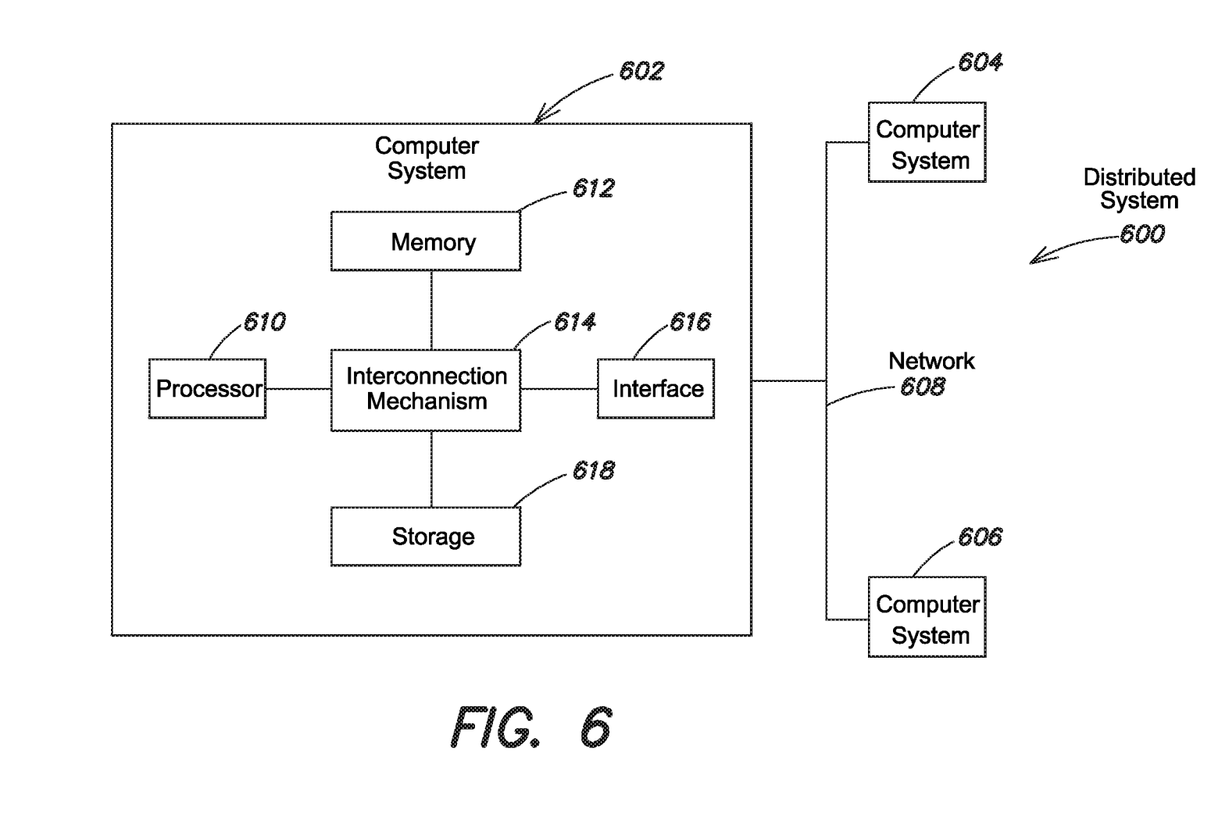
FIG. 6 is a diagram of an example distributed computer system.

FIG. 6 shows a block diagram of a distributed computer system 600, in which various aspects and functions in accord with the present invention may be practiced. The distributed computer system 600 may include one more computer systems that can be specially configured to perform the functions, operations, and/or processes disclosed herein (e.g., estimating the flow rate of water in a river). For example, as illustrated, the distributed computer system 600 includes three computer systems 602, 604 and 606. As shown, the computer systems 602, 604 and 606 are interconnected by, and may exchange data through, a communication network 608. The network 608 may include any communication network through which computer systems may exchange data. To exchange data via the network 608, the computer systems 602, 604, and 606 and the network 608 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA IIOP, RMI, DCOM and Web Services.

Various aspects and functions in accord with the present invention may be implemented as specialized hardware or software executing in one or more computer systems including the computer system 602 shown in FIG. 6. As depicted, the computer system 602 includes a processor 610, a memory 612, a bus 614, an interface 616 and a storage system 618. The processor 610, which may include one or more microprocessors or other types of controllers, can perform a series of instructions that manipulate data. The processor 610 may be, for example, a commercially available processor or controller. As shown, the processor 610 is connected to other system placements, including a memory 612, by the bus 614.

The memory 612 may be used for storing programs and data during operation of the computer system 602. For example, the memory 612 may store terrain information employed in the water flow rate estimation process. Thus, the memory 612 may be a relatively high performance, volatile, random access memory such as a dynamic random access memory (DRAM) or static memory (SRAM). However, the memory 612 may include any device for storing data, such as a disk drive or other non-volatile storage device, such as flash memory or phase-change memory (PCM).

Components of the computer system 602 may be coupled by an interconnection element such as the bus 614. The bus 614 may include one or more physical busses (for example, busses between components that are integrated within a same machine), and may include any communication coupling between system placements including specialized or standard computing bus technologies. Thus, the bus 614 enables communications (for example, data and instructions) to be exchanged between system components of the computer system 602.

Computer system 602 also includes one or more interfaces 616 such as input devices, output devices and combination input/output devices. The interface devices 616 may receive input, provide output, or both. For example, output devices may render information for external presentation. Input devices may accept information from external sources. The interface devices 616 allow the computer system 602 to exchange information and communicate with external entities, such as users and other systems. In some examples, the computer system 602 may exchange information with an imaging system via the interface 616 to capture images of a river.

Storage system 618 may include a computer-readable and computer-writeable nonvolatile storage medium in which instructions are stored that define a program to be executed by the processor. The instructions may be persistently stored as encoded signals, and the instructions may cause a processor to perform any of the functions described herein. A medium that can be used with various examples may include, for example, optical disk, magnetic disk or flash memory, among others. In operation, the processor 610 or some other controller may cause data to be read from the nonvolatile recording medium into another memory, such as the memory 612, that allows for faster access to the information by the processor 610 than does the storage medium included in the storage system 618. The memory may be located in the storage system 618 or in the memory 612. The processor 610 may manipulate the data within the memory 612, and then copy the data to the medium associated with the storage system 618 after processing is completed.

Various aspects and functions in accord with the present invention may be practiced on one or more computers having different architectures or components than that shown in FIG. 6. For instance, the computer system 602 may include specially-programmed, special-purpose hardware, such as for example, an application-specific integrated circuit (ASIC) tailored to perform a particular operation disclosed herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A river velocity estimation system comprising:
a memory;
at least one processor coupled to the memory;
an image analysis component executable by the at least one processor and configured to receive at least one image including a river and identify an area of interest in the at least one image, the area of interest including the river;
a river analysis component executable by the at least one processor and configured to receive terrain information and the area of interest in the at least one image, identify a course of the river and a boundary of the river based on the area of interest in the at least one image, estimate a slope of the river based on the terrain information, determine a hydraulic radius of the river based on the boundary of the river and the course of the river, and generate a model of riverbed contours of the river based on normalized locations of a thalweg of the river, a shape of the riverbed contours being defined by curve parameters corresponding to the normalized locations of the thalweg; and
a flow rate estimation component executable by the at least one processor and configured to estimate a flow rate of water in the river based on at least the slope of the river and the hydraulic radius of the river.

2. The system of claim 1, wherein the image analysis component is further configured to identify the area of interest at least in part by segmenting the river from the at least one image.

3. The system of claim 1, wherein the river analysis component is further configured to align the terrain information with the area of interest in the at least one image.

4. The system of claim 1, wherein the terrain information includes high resolution terrain data.

5. The system of claim 1, wherein the river analysis component is further configured to determine the hydraulic radius by determining a ratio of a cross sectional area of the river to a wetted perimeter of the river.

6. The system of claim 5, wherein the river analysis component is further configured to determine at least one of the cross sectional area of the river and the wetted perimeter of the river based on the model of the riverbed contours.

7. The system of claim 1, wherein the river analysis component is further configured to estimate a degree of resistance of the river.

8. The system of claim 7, wherein the degree of resistance of the river is a Manning's roughness coefficient.

9. The system of claim 7, wherein the flow rate estimation component is further configured to estimate the flow rate of water in the river based on the degree of resistance of the river.

10. A method of estimating a velocity of water in a river, the method comprising:
- receiving, by an image analysis component executable by at least one processor, at least one image including a river;
- identifying, by the image analysis component, an area of interest in the at least one image, the area of interest including the river;
- receiving, by a river analysis component executable by the at least one processor, terrain information;
- identifying, by the river analysis component, a course of the river and a boundary of the river based on the area of interest in the at least one image;
- estimating, by the river analysis component, a slope of the river based on the terrain information;
- determining, by the river analysis component, a hydraulic radius of the river based on the boundary of the river and the course of the river;
- generating, by the river analysis component, a model of riverbed contours of the river based on normalized locations of a thalweg of the river, a shape of the riverbed contours being defined by curve parameters corresponding to the normalized locations of the thalweg; and
- estimating, by a flow rate estimation component executable by the at least one processor, a flow rate of water in the river based on at least the slope of the river and the hydraulic radius of the river.

11. The method of claim 10, wherein identifying the area of interest includes segmenting the river from the at least one image.

12. The method of claim 10, further comprising aligning the terrain information with the area of interest in the at least one image.

13. The method of claim 10, wherein receiving the terrain information includes receiving high resolution terrain data.

14. The method of claim 10, wherein determining the hydraulic radius includes determining a ratio of a cross sectional area of the river to a wetted perimeter of the river.

15. The method of claim 14, further comprising determining at least one of the cross sectional area of the river and the wetted perimeter of the river based on the model of the riverbed contours.

16. The method of claim 10, further comprising estimating a degree of resistance of the river.

17. The method of claim 16, wherein estimating the degree of resistance of the river includes estimating a Manning's roughness coefficient for the river.

18. The method of claim 16, wherein estimating the flow rate of water in the river includes estimating the flow rate of water in the river based on the degree of resistance of the river.

* * * * *